Feb. 21, 1933.  F. H. RAGAN  1,898,265
UNIVERSAL JOINT
Filed March 12, 1930
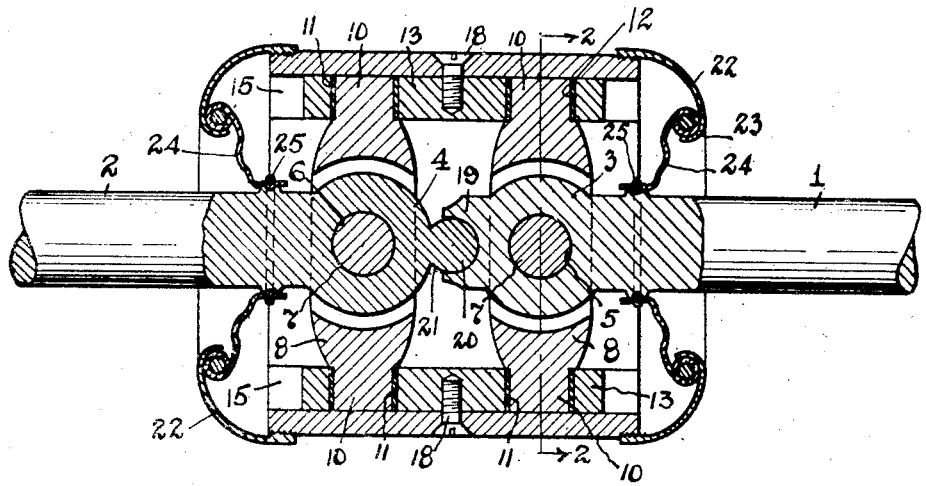
Fig. 1
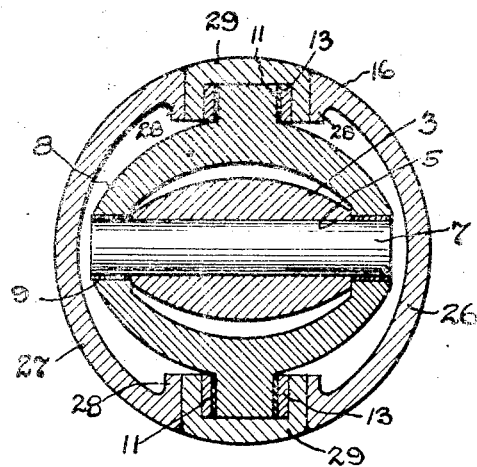
Fig. 3.
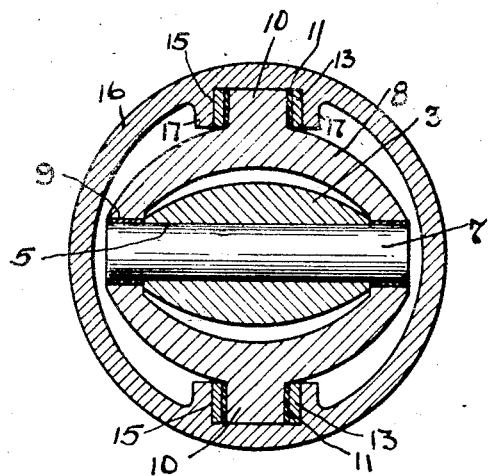
Fig. 2
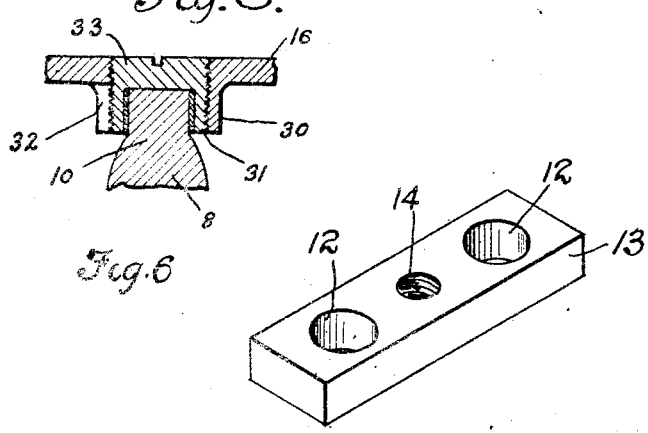
Fig. 6
Fig. 4.
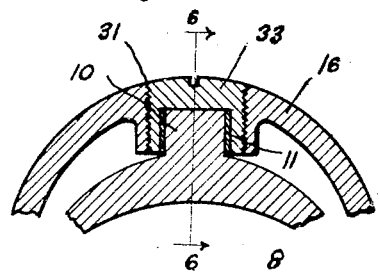
Fig. 5
INVENTOR.
Frederick H. Ragan
BY
Fay, Oberlin & Fay
ATTORNEYS.

Patented Feb. 21, 1933

1,898,265

UNITED STATES PATENT OFFICE

FREDERICK H. RAGAN, OF SHAKER HEIGHTS, OHIO, ASSIGNOR TO THE COLUMBIA AXLE COMPANY, OF CLEVELAND, OHIO, A CORPORATION OF OHIO

UNIVERSAL JOINT

Application filed March 12, 1930. Serial No. 435,163.

My invention, as indicated, relates to universal joints and has specific reference to a universal joint for shafts capable of relatively large angular displacement, which joint is of the so-called constant angular velocity type. All universal joints as heretofore constructed producing a constant velocity of the driven shaft with respect to the drive shaft are undesirable from the standpoint of the cost of manufacture and also the inherent weaknesses of construction which have made all joints of this type unsatisfactory for commercial usage where relatively large torques are required to be transmitted.

In order that a universal joint, as used in connection with a front wheel drive car, may properly transmit the driving torque to the wheels a structure is required which is superior in design from the ordinary universal joint as employed in connection with the drive shaft for rear wheel driven vehicles. Universal joints as used in connection with the drive shaft in rear wheel drive vehicles transmit a relatively low torque at a high speed of rotation of the shaft due to the gear reduction in the common form of differential. However, a universal joint for a front wheel drive car must transmit the full torque of the driving wheel at the speed at which the wheel revolves. For this reason the torque radius in universal joints adapted to be used in connection with front wheel drive cars must be greater than in those joints employed in connection with rear wheel drive cars so as to reduce to a safe working value the unit compression stresses between the torque transmitting member of the universal joint and the means by which the driving torque is transmitted thereto or therefrom. It is also essential to efficient operation of the universal joint that the several interengaging parts be so arranged that a positive lubrication thereof is had at all times without the necessity of employing ducts and the like, which are apt to become clogged and impair the efficiency of the operation of the joint. One of the main features which are desirable in universal joint construction is that the joint as a whole be simply constructed so as to be capable of production in relatively large numbers at nominal cost. It is among the objects of my invention to provide a universal joint which shall have all of the above named desirable characteristics. Other objects of my invention will appear as the description proceeds.

To the accomplishment of the foregoing and related ends, said invention, then, consists of the means hereinafter fully described and particularly pointed out in the claims; the annexed drawing and the following description setting forth in detail certain structures embodying the invention, such disclosed means constituting, however, but one of various mechanical forms in which the principle of the invention may be used.

In said annexed drawing:—

Fig. 1 is a longitudinal sectional view of the universal joint comprising my invention; Figs. 2 and 3 are transverse sectional views of the mechanism illustrated in Fig. 1 taken on the plane substantially indicated by the line 2—2 and showing alternative forms of construction; Fig. 4 is an isometrical view of one form of trunnion engaging means; Fig. 5 is a fragmentary transverse sectional view of a portion of the joint showing an alternative form of trunnion mounting; and Fig. 6 is a fragmentary sectional view of the form as shown in Fig. 5 taken on a plane substantially indicated by the line 6—6.

Referring more specifically to the drawing and more especially to Figs. 1 to 3, inclusive, 1 and 2 designate respectively the shafts which are to be universally interconnected by means of the universal joint, either shaft of which may be considered the drive or the driven shaft. The terminal portions of the shafts 1 and 2 are formed into enlarged portions 3 and 4 substantially elliptical in form, as shown in Figs. 2 and 3. The enlarged portions 3 and 4 have apertures 5 and 6 extending therethrough, which apertures are arranged at right angles to the axis of the respective shafts and which are adapted to secure pins 7.

Substantially elliptical yoke members 8 have bushings 9 secured in apertures formed therefor at the extremities of the major axes thereof, which bushings are adapted to engage the terminal portions of the pin 7 so that the yoke members 8 are freely oscillatable with respect to the terminal portions 3 and 4 of the shafts 1 and 2. The yoke members 8 have integrally formed therewith preferably diametrically opposed trunnions 10, the axes of which are at right angles to the axis of the pin 7.

The trunnions 10 have bushings 11 associated therewith, which bushings are adapted to be received by apertures 12 formed in the trunnion engaging members 13. The trunnion engaging members 13 have threaded apertures 14 formed therein for the purpose hereinafter more fully explained.

The trunnion engaging members 13, when suitably mounted on the trunnions 10, are telescopically engaged by longitudinally extending female splines 15 formed on the inner periphery of a preferably cylindrical torque transmitting member 16, which splines are laterally bounded by inwardly directed longitudinally extending lugs 17. Upon the proper telescopic engagement of the trunnion supporting members 13 by the torque transmitting member 16 proper assembly of the various parts is maintained by means of screws 18 passing through apertures formed therefor in the shell of the torque transmitting member 16 and engaging the threaded apertures 14 of the trunnion engagement means 13.

The terminal portion 3 of the shaft 1 has a projection 19 extending axially therefrom, which projection has a substantially semispherical recess 20 formed therein and adapted to engage a substantially vertical projection 21 secured to the terminal portion 4 of the shaft 2. The torque transmitting member 16 is terminally engaged by shells 22 which are adapted at 23 to support a lubricant retaining and dirt-excluding flexible boot 24, which is substantially conical in form, directed inwardly toward the center of the joint and secured to the respective shafts by means of a ring or band 25.

As shown in Fig. 3, I may prefer to form the torque transmitting member 16 of paired substantially semi-cylindrical members 26 and 27 which have their longitudinal edges 28 rebent inwardly thereof, the contiguous rebent edges 28 having substantially U-shaped longitudinal elements 29 interposed therebetween and secured thereto by welding or otherwise so as to form the inwardly directed lugs, as 17, which border the longitudinally extending female splines. By so forming the torque transmitting shell the cost of its production is materially decreased and its formation to precision limits greatly simplified.

In the assembly of the device the yokes 8 are properly positioned with respect to the terminal portions 3 or 4 of the shafts and the pins 7 inserted to the position shown in Figs. 2 and 3. The two shafts are then brought together so that the spherical contact member 21 engages the socket 20 provided therefor and the trunnion supporting means 13 are then slipped over the trunnions 10. With the assembly so far completed the torque transmitting member 16 is moved axially to telescopically engage the members 13 by means of the female splines 15 and the screws 18 inserted to bind together the members 13 and the torque member 16. The boots and their associated supporting shells are then secured in the manner hereinbefore explained to the terminal portions of the torque transmitting member 16 and the shafts 1 and 2.

As illustrated in Figs. 5 and 6, which show an alternative form of connection between the trunnions and the torque transmitting member I may prefer to have projections 30 formed integrally with the torque member 16 on the inner periphery thereof, which projections are in the form of circular bosses having threaded apertures 31 formed axially therethrough, which bosses are cut away on their outer sides as at 32 so that the trunnions 10 may be introduced to the interior of such lugs and oscillatably secured therein by means of cupped members 33 being screwed into the aperture 31 from the outside torque transmitting member 16. In this form of construction it is not necessary to have female splines on the inner periphery of the torque transmitting member; the lugs, such as 30, formed on the inside of such torque member opposite each trunnion will suffice to serve as a means for oscillatably interconnecting the trunnions and the torque member.

It will be seen from the above description that the shafts 1 and 2 are universally connected by the mechanism comprising my invention regardless of the relative angular displacement of the two shafts, and the spherical contact member 21, engaging the aperture 20, maintains the torque transmitting member 16 in equal angular relation with respect to the two shafts so that the velocity of the driven shaft is at all times equal to the velocity of the drive shaft at all angles employed in the ordinary operation of the motor vehicle and is negligible at any possible usable angle.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a universal joint for shafts capable of relative angular displacement, the combination of a pair of shafts, a torque transmitting member having longitudinal splines, trunnion bearing means pivotally connected to the terminals of said shafts, means oscillatably engaging said trunnions and engaged by said splines, and means for maintaining equal angular relations between said torque member and each of said shafts.

2. In a universal joint for shafts capable of relative angular displacement, the combination of a pair of shafts, a tubular member having longitudinal splines on the inner periphery thereof, means having diametrically opposed trunnions pivotally secured to the terminals of each of said shafts, rigid means oscillatably supporting said trunnions, said rigid means fixedly engaged by said splines, and means for maintaining equal angular relation between said torque member and each of said shafts.

3. In a universal joint for shafts capable of relative angular displacement, the combination of a pair of shafts, a tubular torque-transmitting member, said member formed of arcuate members having rebent longitudinal edges, and substantially U-shaped longitudinal elements interposed between and rigidly secured to said rebent edges, each of said U-shaped elements carrying a longitudinally disposed spline, trunnion bearing means pivotally connected to the terminals of said shafts, means engaging said trunnions and engaged by said splines, and means for maintaining equal angular relation between said torque member and each of said shafts.

4. In a universal joint for shafts, the combination of a pair of shafts, a torque transmitting member having a plurality of axially extending splines, trunnion bearing means pivotally connected to said shafts, and means oscillatably engaging said trunnions and removably secured in said splines.

5. In a universal joint for shafts, the combination of a pair of shafts, a torque transmitting member comprising paired arcuate members having inwardly directed rebent edges and substantially U-shaped members interposed between said elements and rigidly secured to said rebent edges, trunnion bearing means pivotally connected to the terminals of said shafts, and means oscillatably supporting said trunnions removably secured in said U-shaped members.

Signed by me, this 10th day of March, 1930.

FREDERICK H. RAGAN.